（12） United States Patent
Bernard et al.

(10) Patent No.: US 12,214,864 B2
(45) Date of Patent: Feb. 4, 2025

(54) AIRCRAFT PORTION WITH A REDUCED DRAG

(71) Applicant: DASSAULT AVIATION, Paris (FR)

(72) Inventors: Xavier Bernard, Saint Cloud (FR); Zdenek Johan, Saint Cloud (FR); Aurélien Merlet, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 18/373,276

(22) Filed: Sep. 27, 2023

(65) Prior Publication Data

US 2024/0109648 A1  Apr. 4, 2024

(30) Foreign Application Priority Data

Sep. 29, 2022  (FR) ...................... 22 09883

(51) Int. Cl.
*B64C 23/06* (2006.01)
*B64C 1/26* (2006.01)

(52) U.S. Cl.
CPC ............... *B64C 23/06* (2013.01); *B64C 1/26* (2013.01)

(58) Field of Classification Search
CPC .. B64C 23/06; B64C 1/26; B64C 7/00; Y02T 50/10
See application file for complete search history.

(56) References Cited

U.S. PATENT DOCUMENTS

| 5,069,402 | A | 12/1991 | Wortman |
| 6,422,518 | B1 | 7/2002 | Stuff et al. |
| 11,267,552 | B2 | 3/2022 | Merlet et al. |
| 2008/0099610 | A1 | 5/2008 | Jimenez Del Lago et al. |
| 2013/0001362 | A1* | 1/2013 | Kreuzer ............. B64C 23/06 244/130 |
| 2020/0407039 | A1 | 12/2020 | Sanders et al. |

FOREIGN PATENT DOCUMENTS

| DE | 102010008623 A1 | 8/2011 |
| EP | 3756992 A1 | 12/2020 |

OTHER PUBLICATIONS

Search Report for priority application FR 22 09883.

* cited by examiner

*Primary Examiner* — Valentina Xavier
(74) *Attorney, Agent, or Firm* — Davidson Kappel LLC (57) ABSTRACT

An aircraft portion with reduced drag includes a wing-fuselage junction fairing at the interface between the wing and the fuselage. The junction fairing has an outer surface including two lateral portions each covering the root of a respective wing, and a lower portion connecting the side portions to each other and extending under the fuselage. The flow of air around the junction fairing during the movement of the aircraft generates at least two vortices induced on both sides, respectively, of a median longitudinal plane. The aircraft portion also includes at least two vortex generating devices extending from the lower portion of the outer surface of the junction fairing on both sides, respectively, of the median longitudinal plane.

17 Claims, 7 Drawing Sheets

AIRCRAFT PORTION WITH A REDUCED DRAG

The present disclosure relates to an aircraft portion comprising a fuselage extending along a longitudinal direction and having a median longitudinal plane, an airfoil formed by at least one pair of wings arranged on either sides of the fuselage along a transverse direction orthogonal to the median longitudinal plane, and an airfoil-fuselage junction fairing at the interface between the airfoil and the fuselage, said junction fairing having an outer surface comprising two lateral portions each covering the wing root of a respective wing, and a lower portion connecting the lateral portions to each other, extending under the fuselage, the air flow around the junction fairing during the movement of the aircraft generating at least two induced vortices induced on both sides, respectively, of the median longitudinal plane.

BACKGROUND

Subsonic low-wing aircrafts comprising an airfoil-fuselage junction fairing at the interface between their airfoil and their fuselage thereof are known, said fairing covering the wing root by which the airfoil is connected to the fuselage. The junction fairing has an outer surface, the shape of which being designed for favoring the flow of air and thus to avoid aerodynamic disruptions at the wing root. Such fairing is generally also used for housing certain aircraft systems such as pneumatic and/or hydraulic ducts, as well as landing gears.

The shape of the outer surface of the junction fairings is usually designed for minimizing aerodynamic interactions of the fairing with the airfoil. This yields junction fairings whereof:
  the outer surface is in contact with the convex side of each wing of the aircraft along a junction line, the horizontal profile of which is slightly convex, nearly straight, and
  the vertical profile of the lower surface of the junction fairing is also slightly convex, nearly straight.

However, such known aircraft are not entirely satisfactory. It is indeed common that such subsonic aircrafts are suitable for flying at speeds close enough to the speed of sound so that the air flow around the wings of the aircraft moves into a transonic state, generating shock waves on the convex side or even, in some cases, on the concave side, which increase the drag of the aircraft by generating what is commonly called a "wave drag".

Furthermore, regardless of the speed at which such an aircraft moves, the airflow around the junction fairing gives rise to induced vortices also increasing the viscous drag of the aircraft.

SUMMARY

One object of the present disclosure is to provide an airfoil-fuselage junction fairing for reducing the drag of the aircraft and hence the fuel consumption of the aircraft.

For this purpose, the present disclosure relates to an aircraft portion of the aforementioned type, the aircraft portion further comprising at least two vortex generating devices extending from the lower portion of the outer surface of the junction fairing on both sides, respectively, of the median longitudinal plane. The vortex generating devices situated under the junction fairing generate an attenuating vortex which attenuates the intensity of the induced vortices induced by the air flow around the junction fairing and thereby reduces the drag of the aircraft.

According to particular embodiments of the present disclosure, the aircraft portions also have one or a plurality of the following features, taken individually or according to any (all) technically possible combination(s):
  each lateral portion of the outer surface of the junction fairing is separated from the lower portion of the outer surface of the junction fairing by a separation line, the separation line corresponding to a reflection line at 45° with respect to the transverse direction on the outer surface of the junction fairing;
  each vortex generating device is arranged on the path of an induced vortex, each vortex generating device being configured for generating an attenuating vortex having a direction of rotation opposite to the direction of rotation of the corresponding induced vortex;
  the junction fairing is delimited along a vertical direction orthogonal to the longitudinal and transverse directions by an envelope surface, the projection of said envelope surface in the median longitudinal plane drawing a lower profile of the junction fairing, and the convex side of each wing being in contact with said outer surface of the junction fairing along a junction line, the orthogonal projection of which in a projection plane orthogonal to the median longitudinal plane, drawing a horizontal profile of said junction line, the horizontal profile of at least one of the junction lines and/or the lower profile of the junction fairing having successively, in the longitudinal direction, a convex front segment, a concave intermediate segment and a convex rear segment, the air flow around the convex front segment, the concave intermediate segment and the convex rear segment during the movement of the aircraft generating the at least two induced vortices on both sides of the median longitudinal plane and moving the at least two induced vortices away from the outer surface of the junction fairing;
  the wing has a leading edge and a trailing edge, the intersection between the leading edge and the outer surface of the junction fairing defining a front reference point, the intersection between the trailing edge and the longitudinal plane passing through said front reference point defining a rear reference point, and the distance between the front and rear reference points making up a reference length, and the front segment of the horizontal profile comprises a front convexity apex, the intermediate segment of the horizontal profile comprises an intermediate concavity bottom, and the rear segment of the horizontal profile comprises a rear convexity apex, the tangent to the horizontal profile of each of said convexity apices and concavity bottom being parallel to the longitudinal direction, the intermediate concavity bottom being withdrawn towards the median longitudinal plane with respect to each of the front and rear convexity apices;
  the front reference point is situated on the convex front segment;
  the front convexity apex is situated at a non-zero distance from the front reference point along the longitudinal direction;
  the intermediate concavity bottom is at a first secondary longitudinal distance from the front reference point of between 35% and 50% of the reference length;
  the rear convexity apex is at a first tertiary longitudinal distance from the front reference point of between 85% and 100% of the reference length;
  the aircraft portion comprises a first group of vortex generating devices arranged on one side of the lower portion of the outer surface with respect to the median longitudinal plane and a second group of vortex generating devices arranged on the other side of the lower portion of the outer surface with respect to the median longitudinal plane, the vortex generating devices of the same group being arranged on the path of a same induced vortex;

each group of vortex generating devices comprises at least three vortex generating devices;

the lower portion of the outer surface of the junction fairing comprises a forward part situated at the front of the aircraft along the longitudinal direction, a rear part situated opposite the front part along the longitudinal direction and an intermediate part connecting the front and rear parts, the intermediate part extending substantially along a first plane parallel to the longitudinal and transverse directions, the rear part extending substantially along a second plane forming an angle comprised between 0° and 15° with the first plane, each vortex generating device extending from the rear part of the lower portion of the outer surface of the junction fairing;

each vortex generating device comprises a fin extending substantially along a fin plane substantially parallel to a vertical direction orthogonal to the longitudinal and transverse directions;

the fin plane forms an angle with the longitudinal direction, the angle being substantially between −5° and +5°;

each group of vortex generating devices comprises an integer number N of vortex generating devices arranged successively from upstream to downstream, the angle formed by the fin plane of the i-th vortex generating device of the first group of vortex generating devices with the longitudinal direction being equal to the opposite of the angle formed by the fin plane of the i-th vortex generating device of the second group of vortex generating devices with the longitudinal direction, i being an integer number between 1 and N; and each fin comprising:

a base attached to the outer surface of the junction fairing along a line of attachment;

a free lower edge opposite the base;

an upstream edge connecting the base and the free lower edge, the upstream edge being substantially oriented towards the front of the aircraft;

the upstream edge extending along a direction forming an angle with the line of attachment, of between 40° and 50°.

The present disclosure further relates to an in-flight use of an aircraft comprising an aircraft portion as defined hereinabove, the use comprising the following steps:

generation of at least two vortices induced by the air flow around the junction fairing during the movement of the aircraft;

generation by the or each vortex generating device of an attenuating vortex having a direction of rotation opposite to the direction of rotation of the induced vortex.

BRIEF SUMMARY OF THE DRAWINGS

Other features and advantages of the present disclosure will appear upon reading the following description, given only as an example, and making reference to the enclosed drawings, wherein.

DETAILED DESCRIPTION

Figure 1:
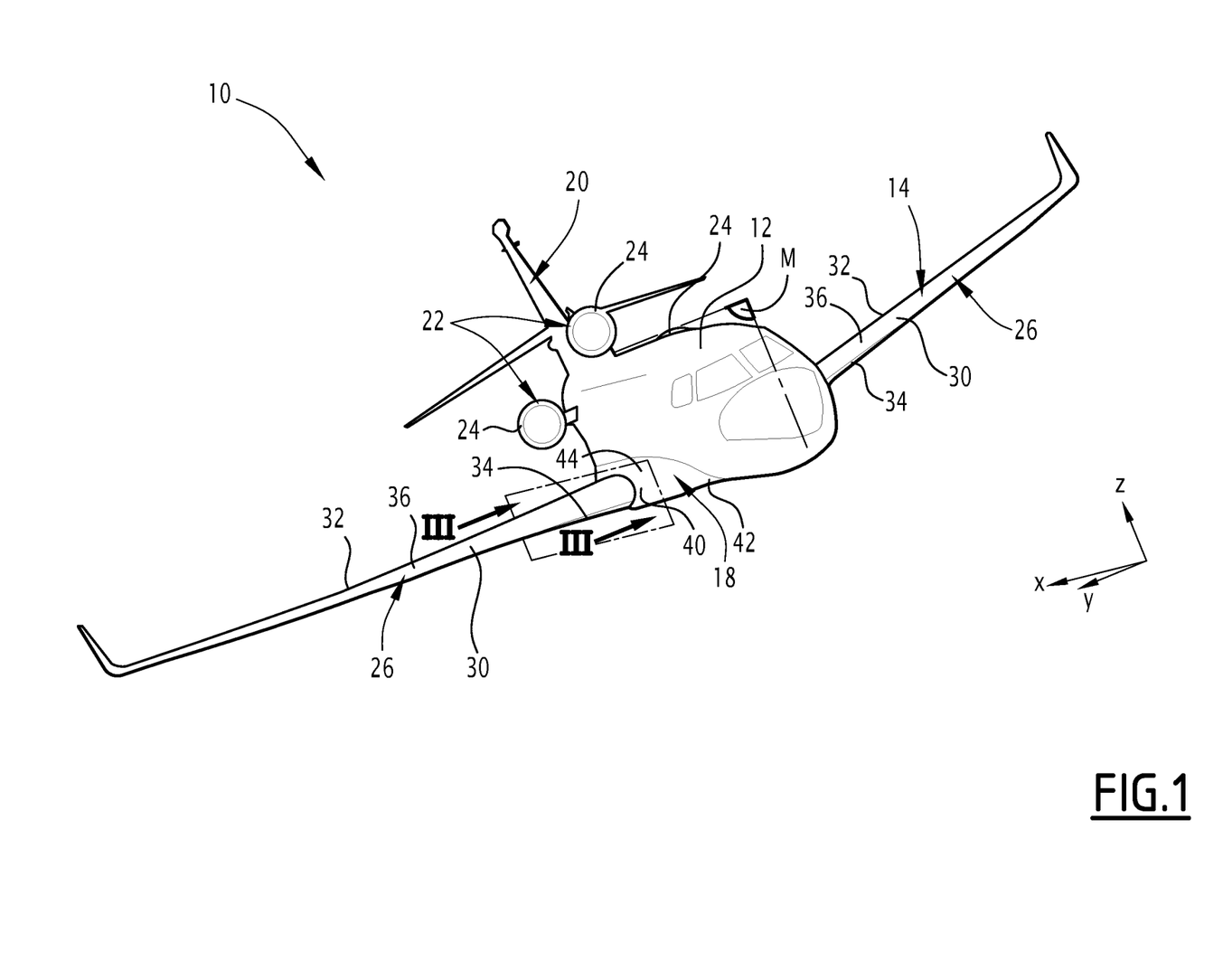
FIG. 1 is a perspective view of an aircraft including an aircraft portion according to the present disclosure.

The aircraft 10 shown in FIG. 1 is a low-winged aircraft. It comprises, in a known manner, a fuselage 12, an airfoil 14, and an airfoil-fuselage junction fairing 18 at the interface between the airfoil 14 and the fuselage 12. The aircraft 10 further comprises a tailplane 20 and a power train 22, the latter consisting herein of three turbojets 24.

Hereinafter, the reference terms are understood with respect to the usual orthogonal coordinate system of aircrafts, which is represented in the Figures, and wherein one can distinguish:

a longitudinal direction X oriented from the front to the rear of the aircraft, a transverse direction Y oriented from the left to the right of the aircraft, said transverse direction Y forming with the longitudinal direction X a horizontal plane (X, Y), and a vertical direction Z oriented from bottom to top, said vertical direction Z forming:

a longitudinal plane (X, Z) with the longitudinal direction X, and a transverse plane (Y, Z) with the transverse direction Y.

The terms "upstream" and "downstream" are also defined with respect to the direction of air flow with respect to the aircraft 10 during the movement of the latter during flight.

The fuselage 12 is elongated along the longitudinal direction X. It is more particularly cylindrical and is centered on a longitudinal axis (not shown) forming the axis of the fuselage 12.

The fuselage 12 has a median longitudinal plane M extending along the longitudinal X and vertical Z directions, said plane M forming more particularly a plane of symmetry of the fuselage 12. The median longitudinal plane M also forms a median longitudinal plane of the aircraft 10, which is advantageously overall symmetrical with respect to the plane M.

The airfoil 14 is formed by a pair of wings 26 arranged on both sides of the fuselage 12 along the transverse direction Y. The wings 26 are more particularly arranged symmetrically relative to each other with respect to the median longitudinal plane M. Optionally, the airfoil 14 also comprises at least one other pair of wings (not shown).

Each wing 26 is mounted on the fuselage 12 at a wing root (not shown). The wing root is located in a lower half of the fuselage 12, more particularly in a lower quarter of the fuselage 12.

Each wing 26 has a leading edge 30 and a trailing edge 32.

The leading edge 30 is made up of the front end line of the wing 26. In other words, the leading edge 30 consists of a line, each point of which forms a front end of the longitudinal section of the wing 26 passing through said point.

The trailing edge 32 is made up of the rear end line of the wing 26. In other words, the trailing edge 32 is made up of a line, each point of which forms a rear end of the longitudinal section of the wing 26 passing through said point.

Moreover, each wing 26 has a concave side 34 and a convex side 36. The concave side 34 is formed by the outer surface of the wing 26 extending from the leading edge 30 to the trailing edge 32, below the wing 26. The convex side 36 is formed by the outer surface of the wing 26 extending from the leading edge 30 to the trailing edge 32, above the wing 26.

The airfoil-fuselage junction fairing 18 comprises two side parts 40, each covering the wing root of a respective wing 26, and a lower part 42 connecting the side parts 40 to each other, extending below the fuselage 12.

The airfoil-fuselage junction fairing 18 has an outer surface 44 oriented opposite the fuselage 12. The outer surface 44 extends continuously over the side parts 40 and over the lower part 42. It is at least of class C 2. More particularly, the outer surface 44 comprises two lateral portions 72 each extending over a side part 40 of the airfoil-fuselage junction fairing 18 and each overlapping the wing root of a respective wing 26 and a lower portion 74 extending over the lower part 42 of the airfoil-fuselage junction fairing 18 and connecting the two lateral portions 72 to each other and extending under the fuselage 12.

Figure 4:
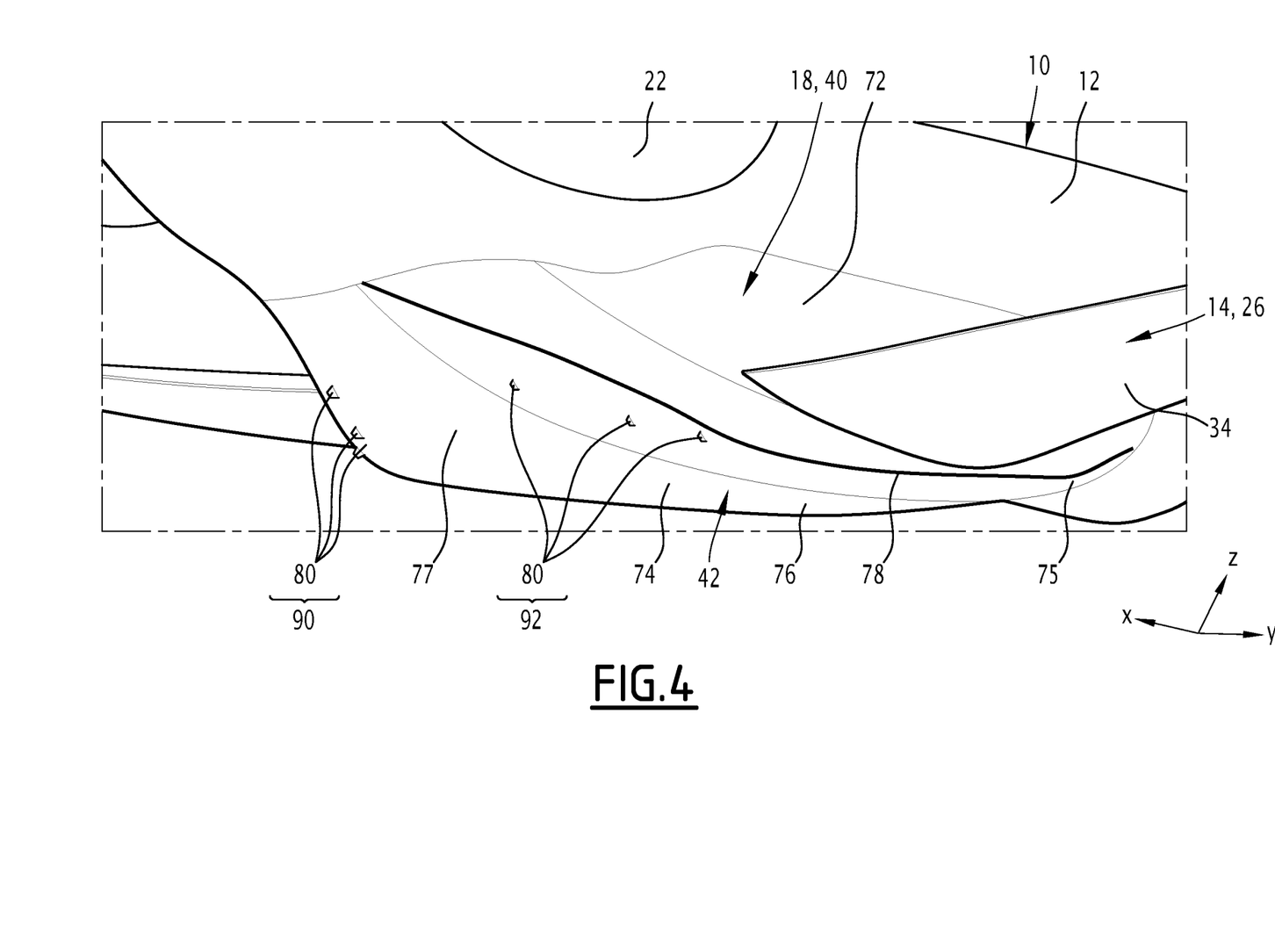
FIG. 4 is a perspective view of a rear part of the aircraft portion shown in FIG. 1.

As illustrated in FIG. 4, each lateral portion 72 of the outer surface 44 of the junction fairing 18 is separated from the lower portion 74 of the outer surface 44 of the junction fairing 18 by a separation line 78. The separation line 78 corresponds to the reflection line at 45° with respect to the transverse direction Y on the outer surface 44 of the junction fairing 18.

The reflection line at 45° with respect to the transverse direction Y comprises all the points of the outer surface 44 of the junction fairing 18, whose surface normal at said points forms an angle of 45° with respect to the transverse direction Y. In other words, an incident light ray along the direction Y hitting a point of the reflection line will be reflected at an angle of 45° with respect to the surface normal at said point.

The separation line 78 geometrically separates the lower portion 74 of the outer surface 44 of the junction fairing 18 and the lateral portion 72 of the outer surface 44 of the corresponding junction fairing 18.

For the points of the lower portion 74 of the outer surface 44 of the junction fairing 18, the reflection line with respect to the transverse direction Y has a reflection angle greater than 45°. For the points of each lateral portion 72 of the outer surface 44 of the junction fairing 18, the reflection line with respect to the transverse direction Y has a reflection angle of less than 45°.

Figure 5:
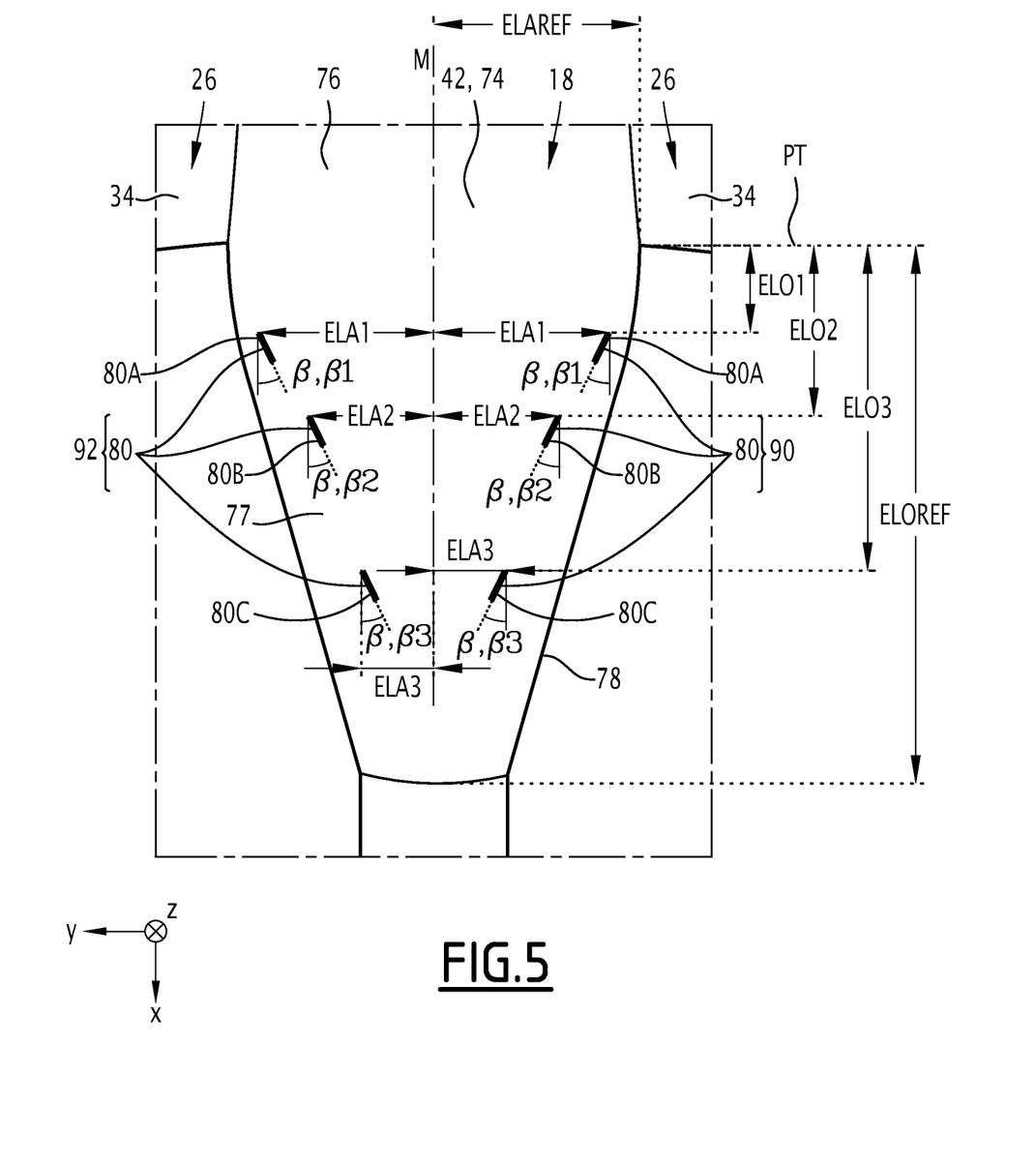
FIG. 5 is a bottom view of the rear part of the aircraft shown in FIG. 4.
Figure 6:
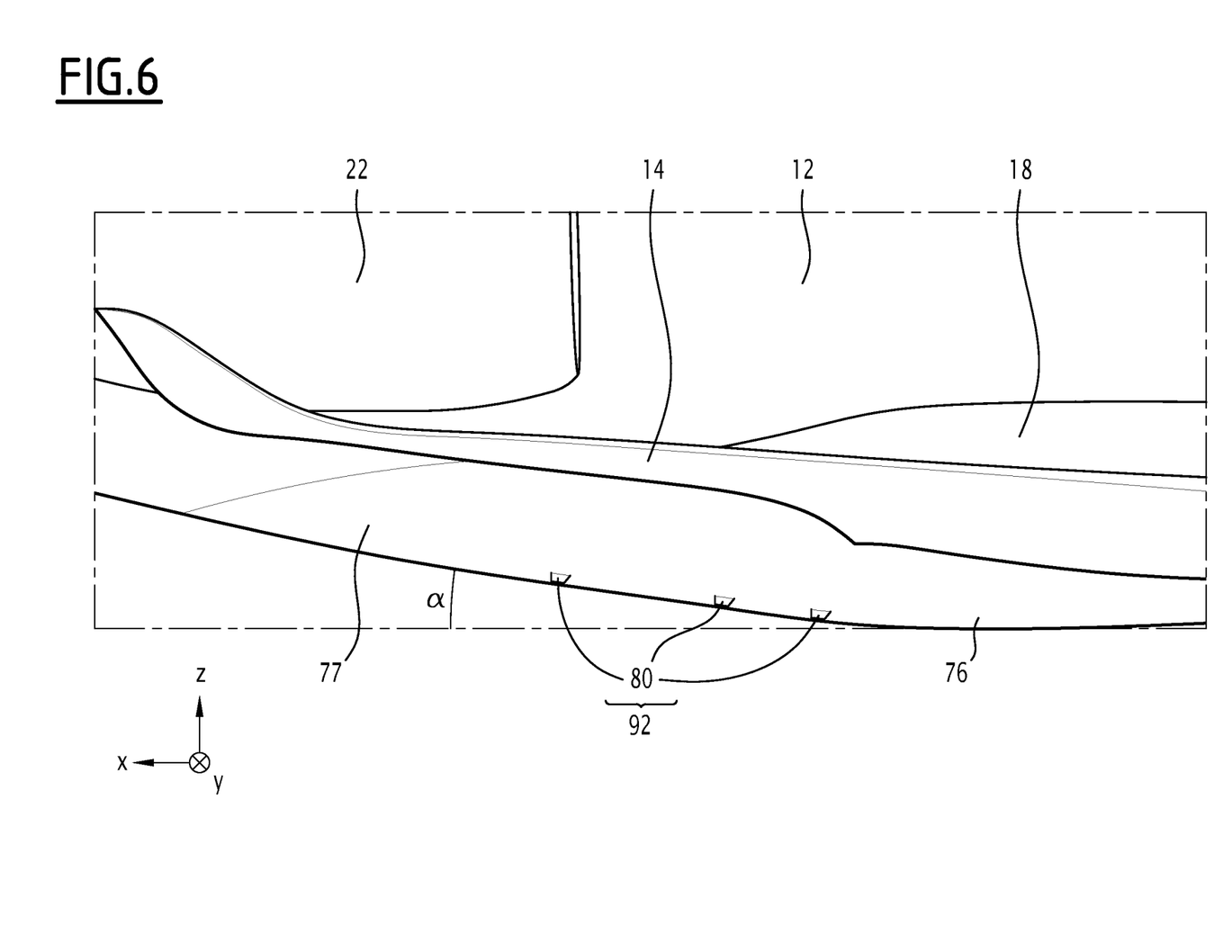
FIG. 6 is a side view of the rear part of the aircraft portion shown in FIG. 4.

With reference to FIGS. 4 to 6, the lower portion 74 of the outer surface 44 of the junction fairing 18 comprises a forward part 75, an intermediate part 76 and a rear part 77.

The forward part 75 is situated furthest forward of the aircraft 10 along the longitudinal direction X. It extends more particularly under the wing roots of the wings and at the front of the wings.

The intermediate part 76 connects the forward 75 and rear 77 parts and extends substantially along a first plane parallel to the longitudinal X and transverse Y directions, below the aircraft.

The rear part 77 is situated opposite the front part along the longitudinal direction X, i.e. at the rear of the aircraft 10 along the longitudinal direction X. Furthermore, as illustrated in FIG. 6, the rear part 77 extends substantially along a second plane forming an angle $\alpha$ with the first plane, comprised between 0° and 15°.

Figure 2:
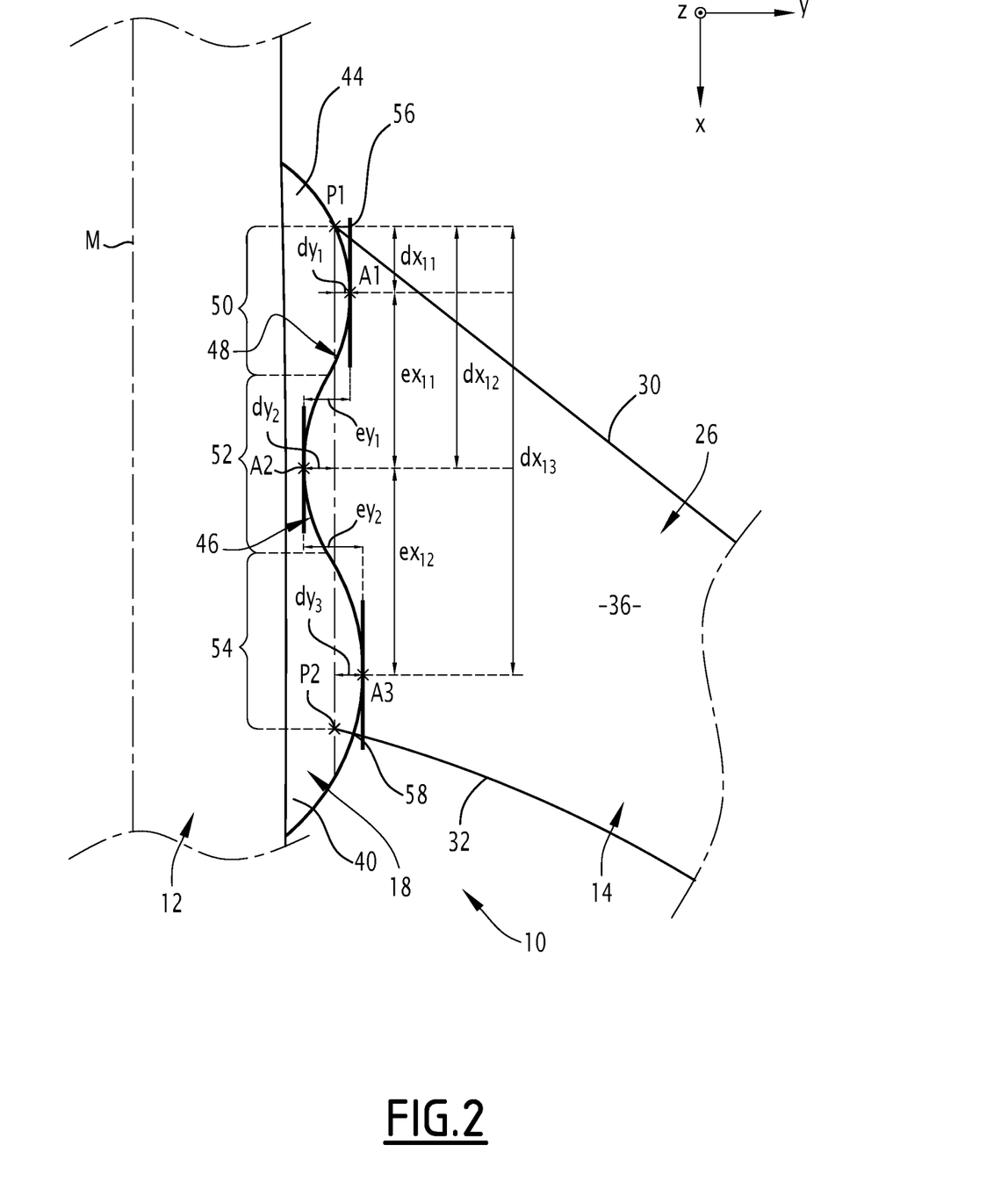
FIG. 2 is a top view of a front part of the aircraft portion shown in FIG. 1.

With reference to FIG. 2, for each wing 26, the leading edge 30 of said wing 26 has an intersection with the outer surface 44 of the junction fairing 18; this intersection defines a front reference point P1. Moreover, the trailing edge 32 of the wing 26 has an intersection with the longitudinal plane passing through the first reference point P1; this intersection defines a rear reference point P2. The segment connecting the points P1 and P2 constitutes a chord from the wing 26 to the wing root, and the distance from P1 to P2 constitutes a chord length L (FIG. 3) from the wing 26 to the wing root. The chord length L is hereinafter called a "reference length".

As illustrated in FIG. 5, a transverse plane PT substantially orthogonal to the longitudinal direction X is also defined, the transverse plane PT passing through the rear reference point P2.

Again with reference to FIG. 2, the convex side 36 of each wing 26 is in contact with the outer surface 44 of the junction fairing 18 along a junction line 46. The junction can be clean or defined by a fillet having a minimum curve radius at said junction line 46. The junction line 46 is at least of class C 2.

Each point of the junction line 46 has a single orthogonal projection, specific to said point, over the segment connecting the front and rear reference points P1, P2. There is thus a bijection linking the points of the junction line 46 to the segment connecting the front and rear reference points P1, P2.

The orthogonal projection of the junction line 46 in a horizontal projection plane draws a horizontal profile 48 of said junction line 46 having successively, along the longitudinal direction X, a front segment 50, an intermediate segment 52 and a rear segment 54, each of said segments 50, 52, 54 being continuous.

These segments 50, 52, 54 are alongside to one another; in other words, the horizontal profile 48 does not comprise any segment interposed between two of said segments 50, 52, 54. Furthermore, the front segment 50 defines a front end 56 of the horizontal profile 48, coinciding with the first reference point P1, and the rear segment 52 defines a rear end 58 of the horizontal profile 48. Thereby, the horizontal profile 48 is formed by the segments 50, 52, 54.

According to the present disclosure, the front segment 50 is convex, the intermediate segment 52 is concave, and the rear segment 54 is convex. It should be noted that the adjectives "convex" and "concave" are understood herein and hereinafter with respect to an observation from the outside of the aircraft 10; thus, a segment called "convex" extends away from the median longitudinal plane M with respect to the segment connecting the longitudinal ends of said segment, and a segment called "concave" extends between the median longitudinal plane M and the segment connecting the longitudinal ends of said segment. Furthermore, each of the sections 50, 52, 54 has no inflection point, except for the junction points between said sections 50, 52, 54. As illustrated in the example shown in FIG. 2, the front reference point P1 is situated on the convex front segment 50.

To facilitate the reading of the drawings, the concave and convex aspects of the segments 50, 52, 54 have been accentuated in FIG. 2.

The front segment 50 comprises a front convexity apex A1 such that the tangent to the horizontal profile 48 at said apex A1 is parallel to the longitudinal direction X. As illustrated in the example shown in FIG. 2, the front convexity apex A1 is situated at a non-zero distance from the front reference point P1 along the longitudinal direction X.

Similarly, the intermediate segment 52 comprises a intermediate concavity bottom A2 such that the tangent to the horizontal profile 48 at the said bottom A2 is parallel to the longitudinal direction X, and the rear segment 54 comprises a rear convexity apex A3 such that the tangent to the horizontal profile 48 at said apex A3 is parallel to the longitudinal direction X. The intermediate concavity bottom A2 is arranged withdrawn towards the median longitudinal plane M relative to each of the front and rear convexity apices A1, A3, i.e. the intermediate concavity bottom A2 is closer to the median longitudinal plane M than each of the front and rear convexity apices A1, A3.

More particularly, the front convexity apex A1 is at a first primary longitudinal distance $dx_{11}$ from the front reference point P1 of between 5% and 20% of the reference length L, the intermediate concavity bottom A2 is at a first secondary longitudinal distance $dx_{12}$ from the front reference point P1 of between 35% and 50% of the reference length L, and the rear convexity apex A3 is at a first tertiary longitudinal distance $dx_{13}$ from the front reference point P1 of between 85% and 100% of the reference length L.

Moreover, the intermediate concavity bottom A2 has a first primary longitudinal deviation $ex_{11}$ with respect to the front convexity apex A1 advantageously of between 15% and 45% of the reference length, e.g. between 25% and 35% of the reference length L, and a first secondary longitudinal deviation $ex_{12}$ with respect to the rear convexity apex A3 advantageously of between 35% and 65% of the reference length L, e.g. of between 45% and 60% of the reference length L.

In addition, the intermediate concavity bottom A2 has a primary transverse deviation $ey_1$ with respect to the front convexity apex A1, preferentially of between 0.5% and 2.5% of the reference length L, e.g. between 1.0% and 2.0% of the reference length L, and a secondary transverse deviation $ey_2$ with respect to the rear convexity apex A3 preferentially between 2.0% and 4.5% of the reference length L, e.g. between 2.5% and 4.0% of the reference length L.

For this purpose, the front convexity apex A1 is typically placed at a primary transverse distance $dy_1$ from the front reference point P1 of between 0.0% and 1.0% of the reference length L, protruding away from the median longitudinal plane M with respect to said point P1, the intermediate concavity bottom A2 at a secondary transverse distance $dy_2$ from the front reference point P1 of between 0.5% and 2.0% of the reference length L, withdrawn towards the median longitudinal plane M with respect to said point P1, and the rear convexity apex A3 at a tertiary transverse distance $dy_3$ from the front reference point P1 of between 1.5% and 3.0% of the reference length L, protruding away from the median longitudinal plane M with respect to said point P1.

Advantageously, the ratio between the deviations $ey_1$ and $ex_{11}$ is between 0.035 and 0.060.

Advantageously still, the ratio between the deviations $ey_2$ and $ex_{12}$ is comprised between 0.055 and 0.065.

According to a particularly preferred embodiment of the present disclosure, the ratio $(ey_2 \times ex_{11})/(ex_{12} \times ey_1)$ is comprised between 1.15 and 1.45.

It has been found that such particular shape of the horizontal profile 48 of the junction lines 46 makes it possible to significantly reduce the force of the shock waves on the convex side of the airfoil and, thereby the wave drag of the aircraft. The result of said particular shape alone is a saving of 1% to 2% in the overall drag of the aircraft 10 when the aircraft flies at a Mach number greater than or equal to MMO-0.05, MMO being the maximum Mach authorized in operation of the aircraft 10.

Figure 3:
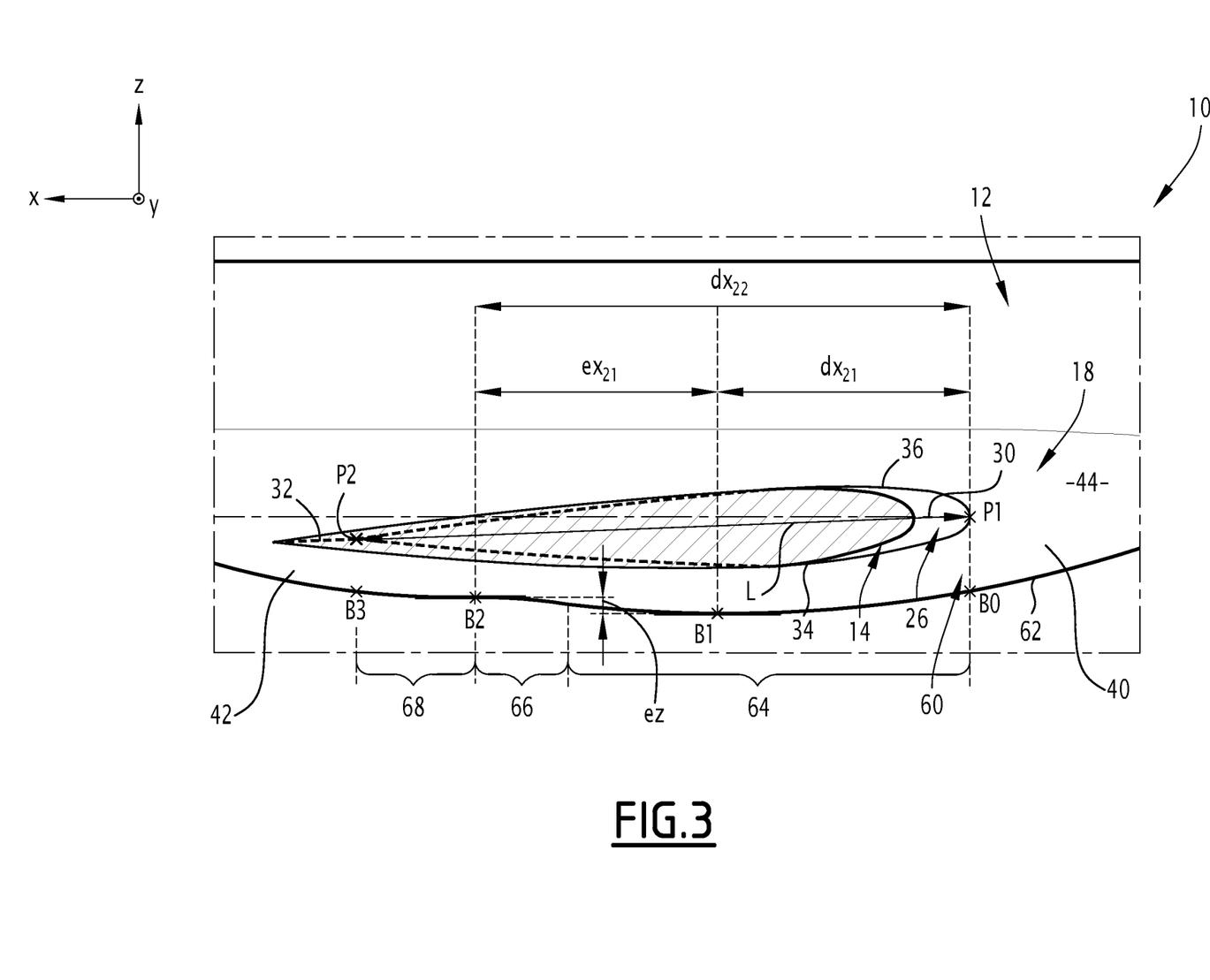
FIG. 3 is a side view of the front part of the aircraft portion shown in FIG. 2, taken along a section plane marked III in FIG. 1.

With reference to FIG. 3, the junction fairing 18 is delimited in the vertical direction Z by an envelope surface 60 such that, a transverse generatrix passes through each point of said envelope surface 60, the generatrix being contained in said envelope surface 60 and flush with the junction fairing 18. The projection of the envelope surface 60 onto the median longitudinal plane M defines a lower profile 62 of the junction fairing 18.

The lower profile 62 has successively, along the longitudinal direction X, a front region 64, an intermediate region 66 and a rear region 68, each of said regions 64, 66, 68 being continuous, the front region 64 having a front end B0 which is substantially vertically aligned with the front reference point P1 and the rear region 68 having a rear end B3 which is substantially vertically aligned with the rear reference point P2.

The regions 64, 66, 68 are joined to one another; in other words, the lower profile 62 does not comprise any section interposed between two of said regions 64, 66, 68.

The portion of the lower profile 62 formed by the joining of the regions 64, 66, 68 has a longitudinal extension equal to the longitudinal extension of the chord of the wings 26 at the wing root.

In the example shown, the front region 64 is convex, the intermediate region 66 is concave, and the rear region 68 is convex. It should be noted that the qualifiers "convex" and "concave" are always understood herein with respect to an observation from the outside of the aircraft 10; thus, a region called "convex" extends away from the fuselage 12 with respect to the segment connecting the longitudinal ends of said region, and a region called "concave" extends between the fuselage 12 and the segment connecting the longitudinal ends of said region. Furthermore, each of the regions 64, 66, 68 has no inflection point, except for the junction points between said regions 64, 66, 68.

To facilitate the reading of the drawings, the concave and convex aspects of the regions 64, 66, 68 have been accentuated in FIG. 3.

The front region 64 comprises a front curve apex B1 such that the tangent to the lower profile 62 at said apex B1 is parallel to the longitudinal direction X. Moreover, the lower profile 62 has, at the interface between the intermediate region 66 and the rear region 68, an inflection point B2 such that the tangent to the lower profile 62 at said inflection point B2 is substantially parallel to the longitudinal direction X. The inflection point B2 is arranged withdrawn towards the fuselage 12 with respect to the front curve apex B1, i.e. the inflection point B2 is closer to the fuselage 12 than the front curve apex B1.

More particularly, the front curve apex B1 is at a second primary longitudinal distance $dx_{21}$ from the front reference point P1 of between 35% and 45% of the reference length L, more particularly of between 37% and 42% of said length L, and the inflection point B2 is at a second secondary longitudinal distance $dx_{22}$ from the front reference point P1 of between 80% and 90% of the reference length L, more particularly of between 83% and 88% of said length L.

Moreover, the inflection point B2 has a second primary longitudinal deviation $ex_{21}$ with respect to the front curve apex B1 advantageously of between 40% and 55% of the reference length L, e.g. between 42% and 51% of the reference length L.

In addition, the inflection point B2 has a vertical deviation ez with respect to the front curve apex B1, preferentially between 1.0% and 2.5% of the reference length L, e.g. between 1.4% and 2.2% of the reference length L.

Advantageously, the ratio between the deviations ez and $ex_{21}$ is advantageously between 0.030 and 0.045, e.g. between 0.035 and 0.042.

It has been found that said particular shape of the vertical profile of the lower surface of the junction fairing 18 makes it possible to reduce the force of the shock waves on the concave side of the airfoil and, thereby, the wave drag of the aircraft. Indeed, it is observed that said shape alone allows a savings of about 1% of the overall drag of the aircraft 10 when same flies at a Mach number greater than or equal to MMO-0.025, MMO being the maximum Mach authorized in operation of the aircraft 10. When combined with the particular shape of the horizontal profile of the junction line 46 described hereinabove, it is thus possible to achieve a savings of nearly 3% of the overall drag of the aircraft 10.

During the movement of the aircraft, the flow of air around the junction fairing 18 generates at least one induced vortex induced by the shape of the junction fairing 18, in particular by the shape of the lower part 42. More particularly, the at least one induced vortex is induced by the shape of the outer surface 44 of the junction fairing 18, in particular by the shape of the lower portion 74 of the outer surface 44 of the junction fairing 18.

More particularly, during the movement of the aircraft, the air flow around the junction fairing 18 generates at least two induced vortices, in particular exactly two vortices induced by the shape of the junction fairing 18, in particular by the shape of the lower part 42. The two induced vortices flow substantially symmetrically with respect to the median longitudinal plane M. In other words, the flow of air around the junction fairing 18 generates at least two vortices induced on both sides, respectively, of the median longitudinal plane M.

Each induced vortex is, more particularly, generated on the lower portion 74 of the outer surface 44 of the junction fairing 18. During the movement of the aircraft 10, each induced vortex propagates along the lower portion 74 towards the rear of the aircraft 10.

Each induced vortex increases the viscous drag of the aircraft 10 regardless of the speed of movement of the aircraft 10 and consequently reduces the aerodynamic performance of the aircraft 10. Each induced vortex is characterized by a direction of rotation. Each of the two induced vortices is characterized by a direction of rotation opposite to the direction of rotation of the other.

A first induced vortex propagates on one side of the lower portion 74 of the outer surface 44 with respect to the median longitudinal plane M and a second induced vortex propagates on the other side of the lower portion 74 of the outer surface 44 with respect to the median longitudinal plane M, in a substantially symmetrical way.

The flow of air around the convex front segment 50, 64, the concave intermediate segment 52, 66 and the convex rear segment 54, 68 during the movement of the aircraft 10 moves the at least one induced vortex away from the outer surface 44 of the junction fairing 18, in particular away from the lower portion 74 of the outer surface 44. In other words, the particular shape of the horizontal profile 48 of the junction lines 46 and the particular shape of the lower profile 62 of the junction fairing 18 causes the detachment of the or each induced vortex from the outer surface 44 of the junction fairing 18, in particular with respect to the lower portion 74 of the outer surface 44 of the junction fairing 18.

Advantageously, the detachment of the or each induced vortex with respect to the outer surface 44 of the junction fairing 18, in particular with respect to the lower portion 74 of the outer surface 44, takes place facing the lower portion 74.

More particularly, the detachment of the or each induced vortex with respect to the outer surface 44 of the junction fairing 18, in particular with respect to the lower portion 74 of the outer surface 44, is due to the shape of the rear convex segment 54, 68 of the horizontal profile 48 of the junction line 46 and/or of the lower profile 62 of the junction fairing 18.

By "detachment" and "moving the at least one induced vortex away from the outer surface" it is meant that, during the movement of the aircraft 10, the or each induced vortex moves away from the outer surface 44 of the junction fairing 18 as the or each induced vortex moves towards the rear of the aircraft 10. The displacement of the at least one induced vortex away from the outer surface 44 of the junction fairing 18 facilitates the palliative action on the at least one induced vortex of a vortex generating device 80 which will be described in more detail hereinbelow.

As illustrated in FIGS. 4 to 7, the aircraft 10 comprises at least one vortex generating device 80, in particular at least two vortex generating devices 80 on both sides, respectively, of the median longitudinal plane M.

The or each vortex generating device 80 extends from the lower portion 74 of the outer surface 44 of the junction fairing 18, more particularly from the rear part 77 of the lower portion 74 of the outer surface 44 of the junction fairing 18. The or each vortex generating device 80 is more particularly situated downstream of the plane PT.

Hereinafter, for the sake of simplicity, unless explicitly indicated otherwise, only one vortex generating device 80 will be described. Except when otherwise specified, the description of the vortex generating device 80 applies to each vortex generating device 80 when the aircraft 10 includes a plurality of such vortex generating devices 80.

Advantageously, the vortex generating device 80 is arranged on the path of an induced vortex and is configured for generating an attenuating vortex having a direction of rotation opposite to the direction of rotation of the corresponding induced vortex.

Figure 7:
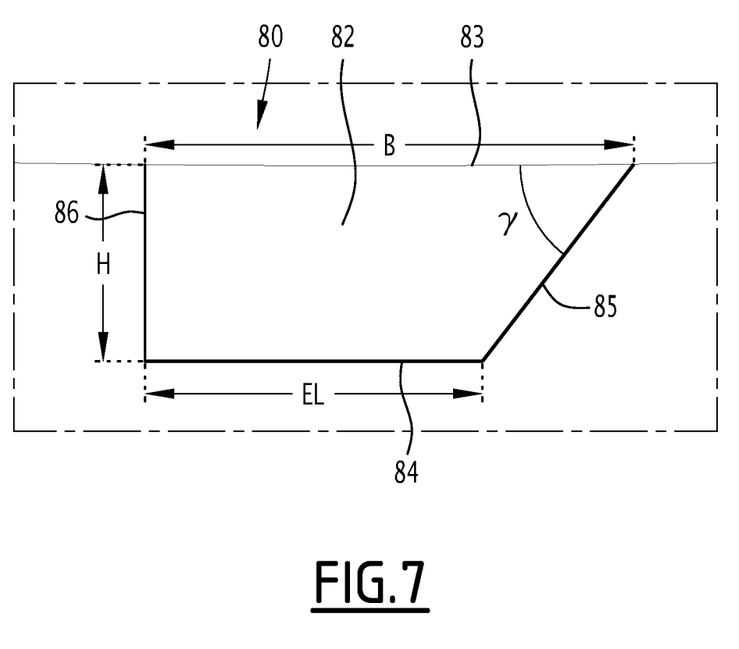
FIG. 7 is a schematic view of a vortex generating device of the aircraft portion shown in FIG. 1.

With reference to FIG. 7, the vortex generating device 80 comprises a fin 82 extending substantially along a fin plane substantially parallel to the vertical direction Z.

The fin 82 is thin. "Thin" means that the fin 82 extends in three dimensions, two of the three dimensions (corresponding to the fin plane) being much greater than the other dimension of the fin 82 (corresponding to a fin thickness, i.e. to a distance between two surfaces of the fin extending substantially parallel to the vertical direction Z). The thickness of the fin 82 is e.g. between 1 mm and 3 mm.

As illustrated in the example shown in FIG. 5, the fin plane forms an angle β with the longitudinal direction X substantially of between −5° and +5°.

With reference to FIG. 7, the fin 82 advantageously comprises a base 83, a free lower edge 84 and an upstream edge 85. Also advantageously, the fin 82 comprises a downstream edge 86.

According to the example illustrated in FIG. 7, the free lower edge 84 of the fin 82 is separated from the base 83 by a height H measured along a direction substantially perpendicular to a line of attachment of the base 83. Advantageously, the height H is comprised between 2 cm and 8 cm, in particular substantially equal to 5 cm.

The base 83 of the fin 82 is attached to the outer surface 44 of the junction fairing along the attachment line. For example, the base 83 has a length B, illustrated in FIG. 7, measured along the line of attachment between an upstream end and a downstream end of the base 83. Advantageously, the length B is comprised between 2 times and 4 times the height H, in particular substantially equal to 3 times the height H.

The free lower edge 84 of the fin 82 is opposite the base 83. According to the example illustrated in FIG. 7, the free lower edge 84 extends along a direction substantially parallel to the line of attachment of the base 83. For example, the free lower edge 84 has a length EL, illustrated in FIG. 7, measured parallel to the line of attachment between an upstream end and a downstream end of the free lower edge 84.

The upstream edge 85 of the fin 82 connects the base 83 to the free lower edge 84. "Upstream" means that the "upstream" edge 85 is situated, with respect to the rest of the fin 82, substantially upstream of the air flow around the junction fairing 18, caused by the movement of the aircraft 10. In other words, as can be seen in FIG. 5, the upstream edge 85 is substantially oriented towards the front of the aircraft 10 along the longitudinal direction X.

As illustrated in FIG. 7, the upstream edge 85 extends along a direction forming an angle γ with the line of attachment of the base 83, comprised between 40° and 50°, advantageously substantially equal to 45°.

The downstream edge 86 of the fin 82 connects the base 83 to the free lower edge 84. "Downstream" means that the "downstream" edge 86 is situated, with respect to the rest of the fin 82, substantially downstream of the air flow around the junction fairing 18 caused by the movement of the aircraft 10. In other words, as can be seen in FIG. 5, the downstream edge 86 is substantially oriented towards the rear of the aircraft 10 along the longitudinal direction X.

According to the example illustrated in FIG. 7, the downstream edge 86 extends along a direction forming an angle with the line of attachment of the base 83, substantially equal to 90°.

According to the example illustrated in FIG. 5, the aircraft 10 comprises a plurality of vortex generating devices 80. Advantageously, the fin planes of the fins 82 of the vortex generating devices 80 form angles $\beta_1$, $\beta_2$, $\beta_3$ with the longitudinal direction X and are distinct from one another.

Advantageously, the aircraft 10 comprises a first group 90 of vortex generating devices 80 and a second group 92 of vortex generating devices 80.

As shown in FIGS. 4 to 6, the vortex generating devices 80 of the first group 90 are arranged on one side of the lower portion 74 of the outer surface 44 with respect to the longitudinal median plane M and the vortex generating devices 80 of the second group 92 are arranged on the other side of the lower portion 74 of the outer surface 44 with respect to the median longitudinal plane M. As illustrated in FIG. 5, the vortex generating devices 80 of the first group 90 and the vortex generating devices 80 of the second group 92 are arranged on both sides, respectively, of the median longitudinal plane M symmetrically with respect to the median longitudinal plane M.

Advantageously, the vortex generating devices 80 of the same group 90, 92 are arranged on the path of a same induced vortex. For example, the vortex generating devices 80 of the first group 90 are arranged on the path of the first induced vortex and the vortex generating devices 80 of the second group 92 are arranged on the path of the second induced vortex.

Each group 90, 92 of vortex generating devices 80 comprises an integer N of vortex generating devices 80 arranged successively from upstream to downstream. According to the example illustrated in FIGS. 4 to 6, each group 90, 92 of vortex generating devices 80 comprises at least three vortex generating devices 80, in particular exactly three vortex generating devices 80. In other words, according to the example of FIGS. 4 to 6, the integer N is equal to 3.

For example, as illustrated in FIG. 5, for each vortex generating device 80 of the first group 90, the angle βi formed by the fin plane of the i-th vortex generating device 80 of the first group 90 of vortex generating devices 80 with the longitudinal direction X is equal to the opposite of the angle βi formed by the fin plane of the i-th vortex generating device 80 of the second group 92 of vortex generating devices 80 with the longitudinal direction X, i being an integer comprised between 1 and N.

In the example illustrated in FIG. 5, for each vortex generating device 80 of the two groups 90, 92, the distance between the upstream end of the upstream edge 85 of the fin 82 and the median longitudinal plane M, measured along the transverse direction Y is greater than the distance between the downstream end of the downstream edge 86 of the fin 82 and the median longitudinal plane M, also measured along the transverse direction Y.

As illustrated in FIGS. 4 to 6, each group 90, 92 of vortex generating devices 80 comprises an upstream vortex generating device 80A, an intermediate vortex generating device 80B and a downstream vortex generating device 80C.

For each group 90, 92, the upstream vortex generating device 80A is the most upstream vortex generating device 80 along the longitudinal direction X, the downstream vortex generating device 80C is the most downstream vortex generating device along the longitudinal direction X and the intermediate vortex generating device 80B is situated between the upstream vortex generating device 80A and the downstream vortex generating device 80C according to the longitudinal direction X.

The upstream 80A, intermediate 80B and downstream 80C vortex generating devices of the first group 90 are described hereinafter. The description also applies, by symmetry, to the upstream 80A, intermediate 80B and downstream 80C vortex generating devices of the second group 92.

The measures of reference longitudinal gap ELOREF and the measures of reference lateral gap ELAREF are defined such that:
  the reference longitudinal gap ELOREF corresponds to the distance between the transverse plane PT and the downstream end of the junction fairing 18, measured along the longitudinal direction X;
  the reference lateral gap ELAREF corresponds to the distance between the median longitudinal plane M and the junction line 78 measured along the transverse direction Y at the abscissa along the longitudinal direction X of the rear reference point P2.

The upstream vortex generating device 80A is characterized by a first longitudinal gap ELO1 with respect to the transverse plane PT. The first longitudinal gap ELO1 is a distance measured along a direction perpendicular to the transverse plane PT, i.e. substantially parallel to the median longitudinal plane M, between the transverse plane PT and the upstream end of the upstream edge 85 of the fin 82 of the upstream vortex generating device 80A. The first longitudinal gap ELO1 is e.g. comprised between 0% and 10% of the reference longitudinal gap ELOREF, in particular substantially equal to 5% of the reference longitudinal gap ELOREF.

The intermediate vortex generating device 80B is characterized by a second longitudinal gap ELO2 with respect to the transverse plane PT. The second longitudinal gap ELO2 is a distance measured along a direction perpendicular to the transverse plane PT i.e. substantially parallel to the median longitudinal plane M, between the transverse plane PT and the upstream end of the upstream edge 85 of the fin 82 of the intermediate vortex generating device 80B. The second longitudinal gap ELO2 is comprised e.g. between 10% and 30% of the reference longitudinal gap ELOREF, in particular substantially equal to 19% of the reference longitudinal gap ELOREF.

The downstream vortex generating device 80C is characterized by a third longitudinal gap ELO3 with respect to the transverse longitudinal plane PT. The third longitudinal gap ELO3 is a distance measured along a direction perpendicular to the transverse plane PT, i.e. substantially parallel to the median longitudinal plane M, between the transverse plane PT and the upstream end of the upstream edge 85 of the fin 82 of the downstream vortex generating device 80C. The third longitudinal gap ELO3 is e.g. between 35% and 50% of the reference longitudinal gap ELOREF, in particular substantially equal to 44% of the reference longitudinal gap ELOREF.

The upstream vortex generating device 80A is characterized by a first lateral gap ELA1 with respect to the median longitudinal plane M. The first lateral gap ELA1 is a distance measured along a direction perpendicular to the median longitudinal plane M, between the median longitudinal plane M and the upstream end of the upstream edge 85 of the fin 82 of the upstream vortex generating device 80A. The first lateral gap ELA1 is e.g. between 80% and 95% of the reference lateral gap ELAREF, in particular substantially equal to 87% of the reference lateral gap ELAREF.

The intermediate vortex generating device 80B is characterized by a second lateral gap ELA2 with respect to the median longitudinal plane M. The second lateral gap ELA2 is a distance measured along a direction perpendicular to the median longitudinal plane M, between the median longitudinal plane M and the upstream end of the upstream edge 85 of the fin 82 of the intermediate vortex generating device 80B. The second lateral gap ELA2 is e.g. between 60% and 75% of the reference lateral gap ELAREF, in particular substantially equal to 68% of the reference lateral gap ELAREF.

The downstream vortex generating device 80C is characterized by a third lateral gap ELA3 with respect to the median longitudinal plane M. The third lateral gap ELA3 is a distance measured along a direction perpendicular to the median longitudinal plane M, between the median longitudinal plane M and the upstream end of the upstream edge 85 of the fin 82 of the downstream vortex generating device 80C. The third lateral gap ELA3 is e.g. comprised between 35% and 50% of the reference lateral gap ELAREF, in particular substantially equal to 42% of the reference lateral gap ELAREF.

Hereinafter, the in-flight use of an aircraft 10 as described hereinabove is described.

As explained hereinabove, at least one induced vortex is generated by the air flow around the junction fairing 18 during the movement of the aircraft 10. More particularly, the air flow around the junction fairing 18 generates at least two induced vortices on both sides, respectively, of the median longitudinal plane M, in particular exactly two induced vortices flowing substantially symmetrically with respect to the median longitudinal plane M.

Advantageously, the flow of air around the convex front segment 50, 64, the concave intermediate segment 52, 66 and the convex rear segment 54, 68 during the movement of the aircraft 10, moves the at least one induced vortex away from the outer surface 44 of the junction fairing 18.

The or each induced vortex generated moves opposite the lower portion 74 of the outer surface 44 of the junction fairing 18 towards downstream.

Each vortex generating device 80, advantageously arranged on the path of an induced vortex, generates an attenuating vortex having a direction of rotation opposite to the direction of rotation of the induced vortex. As the name thereof suggests, the attenuating vortex attenuates the induced vortex, which has the effect of reducing the viscous drag generated by the induced vortex and of improving the aerodynamic performance of the aircraft 10.

By means of the present disclosure, the induced vortices generated by the air flow around the junction fairing 18 are attenuated. Such attenuation results in the reduction of the drag of the aircraft 10. The aerodynamic performance of the aircraft 10 is thereby improved.

Furthermore, the displacement of the at least one vortex induced away from the outer surface 44 of the junction fairing 18, due to the air flow around the convex front segment 50, 64, the concave intermediate segment 52, 66 and the convex rear segment 54, 68 during the movement of the aircraft 10, further reinforces the attenuation of the vortex induced by the vortex generating devices 80.

In a variant, the function fairing 18 has no convex front segment 50, no concave intermediate segment 52 and/or no convex rear segment 54 of the horizontal profile 48 of the junction line 46. The junction fairing 18 nevertheless comprises a vortex generating device 80 as described hereinabove.

In another variant, the function fairing 18 has no convex front segment 64, no concave intermediate segment 66 and/or no convex rear segment 68 of the lower profile 62 of the junction fairing 18. It nevertheless comprises a vortex generating device 80 as described hereinabove.

In yet another variant, the junction fairing 18:
has no convex front segment 50, no concave intermediate segment 52 of the horizontal profile 48 of the junction line 46;
has no convex front segment 64, no concave intermediate segment 66 of the lower profile 62 of the junction fairing 18;
comprises the convex rear segment 54 of the horizontal profile 48 of the junction line 46 and/or the convex rear segment 68 of the lower profile 62 of the junction fairing 18.

It nevertheless comprises a vortex generating device 80 as described hereinabove.

In yet another variant, the fin planes of the fins 82 of the vortex generating devices 80 form angles $\beta1$, $\delta2$, $\delta3$ with the longitudinal direction X, equal to each other. As a further variant, some fin planes of the fins 82 of the vortex generating devices 80 form distinct angles $\beta1$, $\beta2$, $\beta3$ with the longitudinal direction X and other fin planes form angles $\beta1$, $\beta2$, $\beta3$ with the longitudinal direction X equal to each other.

According to yet another variant, for each vortex generating device 80 of the two groups 90, 92, the distance between the upstream end of the upstream edge 85 of the fin 82 and the median longitudinal plane M, measured along the transverse direction Y is less than the distance between the downstream end of the downstream edge 86 of the fin 82 and the median longitudinal plane M, also measured along the transverse direction Y.

According to yet another variant, for certain vortex generating devices 80 of the same group 90, 92, the distance between the upstream end of the upstream edge 85 of the fin 82 and the median longitudinal plane M, measured along the transverse direction Y, is greater than the distance between the downstream end of the downstream edge 86 of the fin 82 and the median longitudinal plane M, also measured along the transverse direction Y and for other vortex generating devices 80 of the same group 90, 92, the distance between the upstream end of the upstream edge 85 of the fin 82 and the median longitudinal plane M, measured along the transverse direction Y, is less than the distance between the downstream end of the downstream edge 86 of the fin 82 and the median longitudinal plane M, also measured along the transverse direction Y.

What is claimed is:

1. An aircraft portion of an aircraft comprising:
a fuselage extending along a longitudinal direction and having a median longitudinal plane;
an airfoil formed by at least one pair of wings arranged on either sides of the fuselage along a transverse direction orthogonal to the median longitudinal plane;
an airfoil-fuselage junction fairing at an interface between the airfoil and the fuselage, the airfoil-fuselage junction fairing having an outer surface comprising two lateral portions each covering a wing root of a respective one of the wings, and a lower portion connecting the two lateral portions to each other, extending under the fuselage, an air flow around the airfoil-fuselage junction fairing during a movement of the aircraft generating at least two induced vortices induced on both sides, respectively, of the median longitudinal plane; and
at least two vortex generating devices extending from the lower portion of the outer surface of the airfoil-fuselage junction fairing on both sides, respectively, of the median longitudinal plane.

2. The aircraft portion according to claim 1, wherein each lateral portion of the outer surface of the airfoil-fuselage junction fairing is separated from the lower portion of the outer surface of the airfoil-fuselage junction fairing by a separation line, the separation line corresponding to a reflection line at 45° with respect to the transverse direction on the outer surface of the airfoil-fuselage junction fairing.

3. The aircraft portion according to claim 1, wherein each vortex generating device is arranged on a path of an induced vortex, each vortex generating device being configured for generating an attenuating vortex having a direction of rotation opposite to the direction of rotation of the corresponding induced vortex.

4. The aircraft portion according to claim 1, wherein the airfoil-fuselage junction fairing is delimited in a vertical direction orthogonal to the longitudinal and transverse directions by an envelope surface, a projection of said envelope surface in the median longitudinal plane drawing a lower profile of the airfoil-fuselage junction fairing, and a convex side of each wing being in contact with said outer surface of the airfoil-fuselage junction fairing along a junction line a orthogonal projection of which in a projection plane orthogonal to the median longitudinal plane drawing a horizontal profile of said junction line, the horizontal profile of at least one junction line and/or the lower profile of the airfoil-fuselage junction fairing having successively, in the longitudinal direction, a convex front segment, a concave intermediate segment and a convex rear segment, the air flow around the convex front segment, the concave intermediate segment and the convex rear segment during the movement of the aircraft generating the at least two induced vortices on both sides of the median longitudinal plane and moving the at least two induced vortices away from the outer surface of the airfoil-fuselage junction fairing.

5. The aircraft portion according to claim 4, wherein each wing has a leading edge and a trailing edge, an intersection between the leading edge and the outer surface of the airfoil-fuselage junction fairing defining a front reference point, an intersection between the trailing edge and a longitudinal plane passing through said front reference point defining a rear reference point, and a distance between the front and rear reference points making up a reference length, and the convex front segment of the horizontal profile comprises a front convexity apex, the concave intermediate segment of the horizontal profile comprising an intermediate concavity bottom, and the convex rear segment of the horizontal profile comprising a rear convexity apex, a tangent to the horizontal profile of each of the front and rear convexity apices and the intermediate concavity bottom being parallel to the longitudinal direction, the intermediate concavity bottom being withdrawn towards the median longitudinal plane with respect to each of the front and rear convexity apices.

6. The aircraft portion according to claim 5, wherein the front reference point is situated on the convex front segment.

7. The aircraft portion according to claim 5, wherein the front convexity apex is situated at a non-zero distance from the front reference point along the longitudinal direction.

8. The aircraft portion according to claim 5, wherein the intermediate concavity bottom is at a first secondary longitudinal distance from the front reference point of between 35% and 50% of the reference length.

9. The aircraft portion according to claim 5, wherein the rear convexity apex is at a first tertiary longitudinal distance from the front reference point of between 85% and 100% of the reference length.

10. The aircraft portion according to claim 1, wherein the aircraft portion comprises a first group of vortex generating devices arranged on one side of the lower portion of the outer surface with respect to the median longitudinal plane and a second group of vortex generating devices arranged on the other side of the lower portion of the outer surface with respect to the median longitudinal plane, the vortex generating devices of a same group being arranged on a path of a same induced vortex.

11. The aircraft portion according to claim 10, wherein each group of vortex generating devices comprises at least three vortex generating devices.

12. The aircraft portion according to claim 1, wherein the lower portion of the outer surface of the airfoil-fuselage junction fairing comprises a front part situated at a front of the aircraft along the longitudinal direction, a rear part situated opposite the front part along the longitudinal direction and an intermediate part connecting the front and rear parts, the intermediate part extending substantially along a first plane parallel to the longitudinal and transverse directions, the rear part extending substantially along a second plane forming an angle between 0° and 15° with the first plane, each vortex generating device extending from the rear part of the lower portion of the outer surface of the airfoil-fuselage junction fairing.

13. The aircraft portion according to claim 1, wherein each vortex generating device comprises a fin extending substantially along a fin plane substantially parallel to a vertical direction orthogonal to the longitudinal and transverse directions.

14. The aircraft portion according to claim 13, wherein the fin plane forms an angle with the longitudinal direction, the angle being substantially between −5° and +5°.

15. The aircraft portion according to claim 14, wherein the aircraft portion comprises a first group of vortex generating devices arranged on one side of the lower portion of the outer surface with respect to the median longitudinal plane and a second group of vortex generating devices arranged on the other side of the lower portion of the outer surface with respect to the median longitudinal plane, the vortex generating devices of a same group being arranged on a path of a same induced vortex; and
    wherein each group of vortex generating devices comprises an integer number N of vortex generating devices arranged successively from upstream to downstream, the angle formed by the fin plane of the i-th vortex generating device of the first group of vortex generating devices with the longitudinal direction being equal to an opposite of the angle formed by the fin plane of the i-th vortex generating device of the second group of vortex generating devices with the longitudinal direction, where i is an integer number between 1 and N.

16. The aircraft portion according to claim 13, wherein each fin comprises:
    a base attached to the outer surface of the airfoil-fuselage junction fairing along a line of attachment;
    a free lower edge opposite the base;
    an upstream edge connecting the base and the free lower edge, the upstream edge being substantially oriented towards a front of the aircraft;
the upstream edge extending along a direction forming an angle with the line of attachment, of between 40° and 50°.

17. A method of operating the aircraft comprising the aircraft portion according to claim 1 in-flight, the method comprising the following steps:
    generating at least two vortices induced by the air flow around the airfoil-fuselage junction fairing during the movement of the aircraft; and
    generating by the or each vortex generating device an attenuating vortex having a direction of rotation opposite to the direction of rotation of the induced vortex.

\* \* \* \* \*